United States Patent
Nadabar et al.

(10) Patent No.: US 9,213,875 B1
(45) Date of Patent: Dec. 15, 2015

(54) SYSTEM AND METHOD FOR AUTOMATICALLY MODELING SYMBOLOGY DATA IN A SYMBOLOGY READER

(75) Inventors: Sateesha Nadabar, Framingham, MA (US); Ivan Bachelder, Hillsborough, NC (US)

(73) Assignee: COGNEX CORPORATION, Natick, MA (US)

( * ) Notice: Subject to any disclaimer, the term of this patent is extended or adjusted under 35 U.S.C. 154(b) by 825 days.

(21) Appl. No.: 11/488,899

(22) Filed: Jul. 18, 2006

(51) Int. Cl.
*G02B 5/00* (2006.01)
*G06K 7/10* (2006.01)

(52) U.S. Cl.
CPC .................. *G06K 7/10702* (2013.01)

(58) Field of Classification Search
USPC ........................ 235/462.32, 432.01
See application file for complete search history.

(56) References Cited

U.S. PATENT DOCUMENTS

| | | | | |
|---|---|---|---|---|
| 6,145,745 A | * | 11/2000 | Hauser et al. | 235/462.07 |
| 6,340,119 B2 | * | 1/2002 | He et al. | 235/494 |
| 6,454,168 B1 | * | 9/2002 | Brandt et al. | 235/462.12 |
| 7,175,090 B2 | * | 2/2007 | Nadabar | 235/462.1 |
| 2006/0043186 A1 | | 3/2006 | Nadabar | |

* cited by examiner

*Primary Examiner* — Rafferty Kelly
(74) *Attorney, Agent, or Firm* — Quarles & Brady LLP

(57) ABSTRACT

This invention overcomes the disadvantages of the prior art by providing a system and method for reading symbology, and more typically linear barcodes ("symbols") that employs trained attributes that remain invariant between scans of different barcodes during runtime to tune various aspects of the procedure for locating and decoding such barcodes. The procedure relies upon a training step in which one or more exemplary barcodes are decoded and the invariant attributes for such barcodes, including, but not limited to, size, shape, relative angle in the image field of view and resolution are stored. The runtime decoding procedure then employs these attributes to constrain the search for subsequent, scanned barcodes and then decode it according to a plurality of tuned steps.

26 Claims, 6 Drawing Sheets

SYSTEM AND METHOD FOR AUTOMATICALLY MODELING SYMBOLOGY DATA IN A SYMBOLOGY READER

BACKGROUND OF THE INVENTION

1. Field of the Invention

This invention relates to symbology readers and more particular to systems for acquiring and decoding symbology images.

2. Background Information

Machine vision systems use image acquisition devices that include camera sensors to deliver information on a viewed subject. The system then interprets this information according to a variety of algorithms to perform a programmed decision-making and/or identification function.

Symbology reading entails the aiming of an image acquisition sensor (CMOS camera, CCD, etc.) at a location on an object that contains a symbol (a "barcode"), and acquiring an image of that symbol. The symbol contains a set of predetermined patterns that represent an ordered group of characters or shapes from which an attached data processor (for example, a microcomputer) can derive useful information about the object (e.g. its serial number, type, model, price, etc.). Symbols/barcodes are available in a variety of shapes and sizes. One of the most commonly employed symbol types used in marking and identifying objects are the so-called one-dimensional or "linear" barcode, one common for of which comprises a series of vertical stripes of varying width and spacing.

By way of background, FIG. 1 shows an exemplary scanning system 100 adapted for fixed-mount operation. An exemplary scanning appliance 102 is provided. It includes a housing section 104, imaging lens 103 and mounting structure 106 that maintains the scanning appliance in a relatively fixed position with respect to an object 105 or other subject of interest. Note that the object 105 can be directed through the scanning appliance's field of view using a conveyor 130 that moves, for example, in the direction of arrow 132. An image formation system 151 within the housing (in optical communication with the lens 103 is shown in phantom. The image formation 151 can be controlled by, and can direct image data to, an onboard embedded processor 109 (shown outside the housing 104 for clarity). This processor 109 can include a scanning software application 113 by which lighting is controlled, images are acquired and image data is interpreted into usable information (for example, alphanumeric strings derived from the symbols, such as the depicted one-dimensional or "linear" barcode 195 on the surface of the object 105). The decoded information can be directed via a cable 111 to a PC or other data storage device 112 having (for example) a display 114, keyboard 110 and mouse 118, where it can be stored and further manipulated using an appropriate application 121. In this example, the barcode data is translated by the application, using known techniques, into appropriate alphanumeric characters 196, which are provided (by way of example) on the display 114 as shown. Alternatively, the cable 111 can be directly connected to an interface in the scanning appliance and an appropriate interface in the computer 112. In this case the computer-based application 121 performs various image interpretation/decoding and lighting control functions as needed. The precise arrangement of the handheld scanning appliance with respect to an embedded processor, computer or other processor is highly variable. For example, a wireless interconnect can be provided in which no cable 111 is present. Likewise, the depicted microcomputer can be substituted with another processing device, including an onboard processor or a miniaturized processing unit such as a personal digital assistant or other small-scale computer device.

The scanning application 113 can be adapted to respond to inputs from the scanning appliance 102. For example, when the operator or the conveyor triggers an image-acquisition operation, an internal camera image sensor (that is part of the image formation system 151) acquires an image of a region of interest 131 on the object 105. The exemplary region of interest includes a one-dimensional symbol 195 that can be used to identify the object 105. Identification and other processing functions are carried out by the scanning application 113, based upon image data transmitted from the hand held scanning appliance 102 to the processor 109. A visual indicator 141 can be illuminated by signals from the processor 109 to indicate a successful reading and decoding of the symbol 195.

Where image sensors are employed to read and decode symbology, it is common for the reader to acquire an image in a region of interest (131 in this example) that is often significantly larger than the bounds of the actual symbol 195. To properly decode the underlying information in a barcode, the reader's application must first determine the location of the barcode within the overall region of interest. This generally entails the recognition that a barcode pattern is actually present in the region of interest. A variety of techniques are employed to determine whether, and where, a barcode resides in an image. A more complete description of such techniques is described below. Once the barcode pattern is recognized, the boundaries of the barcode and its angular orientation must be established, at least approximately, so that it can be read completely. Finally, the image of the barcode within the overall set of acquired image data must be interpreted using known image-decoding techniques that rely, in part, upon an estimation of the approximate resolution (minimum distance between features, which also relates to its apparent size) of the barcode derived from the previous scanning steps.

Commonly assigned, published U.S. Patent application Serial No. 2006/0043186 to Nadabar addresses certain inefficiencies in reading two-dimensional type barcodes by providing models from previously discerned images of a barcode that assist in future reading of barcodes by, for example, identifying the specific symbol type for use in future scans. This application is expressly incorporated herein by reference. These techniques are particularly adapted to barcodes that present information in two dimensions, including, for the purposes of that discussion, stacked barcodes. The incorporated description relates largely to identifying the type of symbol. It is recognized, however, that under certain conditions, a runtime symbol search and decode procedure may implicate similar symbols with a plurality of invariant features. Techniques specifically adapted to one-dimensional barcodes/symbols and techniques that take advantage a variety of invariant features beyond symbol type are desirable as they could substantially increase yield in decoding scanned one-dimensional symbols, while reducing processing overhead.

To this end, the resolution, or size of the barcode within the region of interest may be highly variable, likewise, its angular orientation may be subject to great variability. As such, the reader typically expends a significant degree of processing overhead in locating and recognizing a barcode within the acquired image data. This reduces the reading speed, and moreover, increases the possibility of an erroneous read. Accordingly, it is desirable to provide a system and method for reading symbology, and in particular, one-dimensional barcodes of various types, that increases read-reliability and decreases processing overhead.

SUMMARY OF THE INVENTION

This invention overcomes the disadvantages of the prior art by providing a system and method for reading symbology, and more typically linear barcodes ("symbols") that employs trained attributes that remain invariant between scans of different barcodes during runtime to tune various aspects of the procedure for locating and decoding such barcodes. The procedure relies upon a training step in which one or more exemplary barcodes are decoded and the invariant attributes for such barcodes, including, but not limited to, size, shape, relative angle in the image field of view and resolution are stored. The runtime decoding procedure then employs these attributes to constrain the search for subsequent, scanned barcodes and then decode it according to a plurality of tuned steps.

According to an illustrative embodiment, the system training includes a plurality of steps. First the system acquires, within the system's field of view, an image of an exemplary symbol having the same invariant features as those symbols to be scanned during the runtime decoding process. The exemplary symbol is then searched-for, located and using known techniques. Such techniques can include, generally, (a) pre-processing the image; (b) performing a line-scan of the image field of view at a default set of line spacings and angular orientations (c) searching for symbol-like features with appropriate contrast variations, etc., within the scan lines; (d) dividing the images into tiles of predetermined size and searching tiles in the regions of promising scan lines; (e) growing tiles in various directions around promising "seed tiles" where symbol-like features (e.g. parallel lines) are present; (f) retaining seed and grown tiles with symbol-like features and discarding seed and/or grown tiles that do not contain such features; and when a readable symbol is attained through growth of tiles, decoding the exemplary symbol using known techniques. After the exemplary symbol is decoded, attributes deemed by the user or automatically to be "invariant" are extracted from the search and decoding procedure. Such invariant features can include, but are not limited to, symbol height and width (size, generally), minimum bar width (i.e. resolution), symbol angle in the image field, symbol polarity and type of symbol (e.g. Postnet code, UPC code, etc.). Most attributes can be derived directly from the decoding process. Alternatively attributes can be derived during the scan using known machine vision tools, such as a caliper edge tool. Next the derived invariant attributes are stored for subsequent use during the runtime "tuned" decoding procedure.

In an illustrative embodiment the system performs a "tuned" search and decode procedure on different symbol of the same type, and with the same invariant fixtures (but potentially different invariant features, such as specific code sequence). During runtime, this tuned search and decode procedure iteratively acquires and image each of a plurality of symbols within the field of view of the system. In general, the resolution and angle of the acquired symbols are invariant assuming that each symbol is located at approximately the same orientation and distance with respect to the system's field of view. After acquiring the image, the system employs the stored attributes for the exemplary symbol to constrain (tune) the search for the different symbol. The tuned search may include a variety of tuned steps. For example, the system may preprocess the image of the different symbol(s) to enhance the symbol bars (or other data-carrying features) in view of a known resolution. In addition, the attributes may allow the system to limit processing to image neighborhoods (line scans, etc.) that are commensurate with the expected resolution. The system may limit the symbol search (using scan lines, windows, etc.) to a small range of angles about the expected angular orientation. The system may also use the expected polarity to determine symbol feature thresholds. The system can, further, use the learned attributes to reject candidate symbol features that cannot possibly arise given the known information about symbols. The system can also employ only search and decode techniques, based on the attribute of known symbol type, which are particularly relevant to the known symbol type. Once the symbol has been located by the tuned search, the system can apply attribute-tuned image filtration and decoding techniques to produce a decoded data stream for each scanned symbol.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
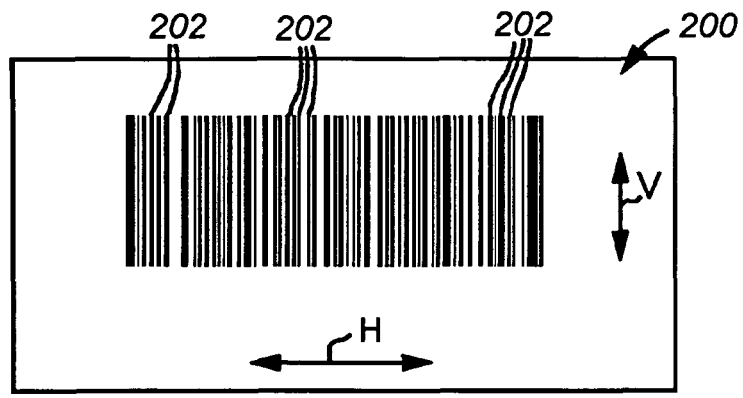
FIG. 2 is an exemplary one-dimensional or linear barcode commonly employed for identifying products and items according to a standard implementation.
Figure 3:
FIG. 3 is an exemplary one-dimensional or linear barcode commonly employed for postal addresses according to a standard implementation.
Figure 4:
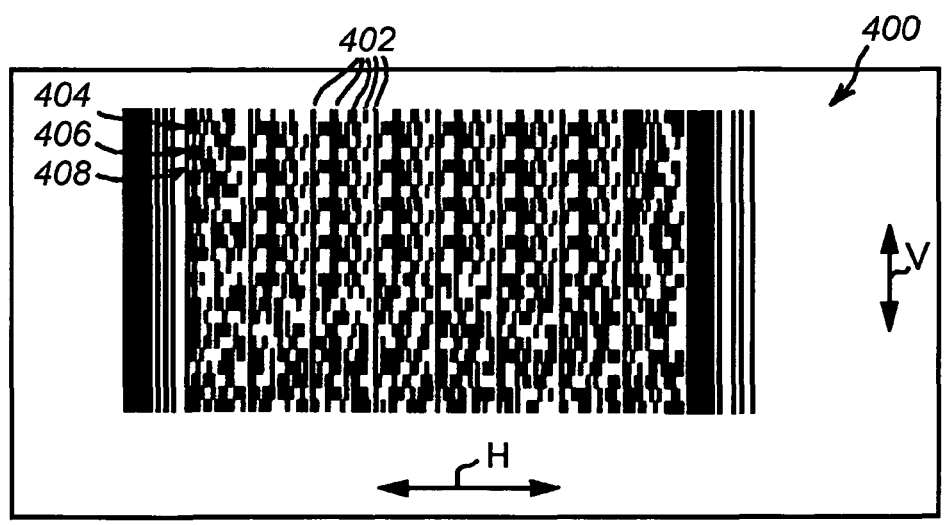
FIG. 4 is a one-dimensional or linear barcode utilizing a so-called "stacked" relationship in which a plurality of individual linear barcodes are arranged along an orthogonal axis.

A variety of exemplary one-dimensional or "linear" barcodes are shown in FIGS. 2-4. With reference to FIG. 2, a barcode 200 that is popularly employed in the marking of retail products is shown. This is the so-called "Code 93" format code. Another popular code of this general type is the so-called "UPC" code. Yet another similar format is known as Code 128-B. The depicted code 200 is characterized by a set of vertically disposed (direction arrow V) bars 202 that are disposed along an orthogonal (perpendicular) direction (arrow H). In this exemplary code, the vertical bars are of relatively constant length and they vary in terms of horizontal width and spacing. Note, as used herein the terms "vertical" and "horizontal" are to be taken as arbitrary conventions to ascribe relative geometric characteristics to each exemplary barcode type. In practice, the barcodes described herein can be defined by any set of directional conventions. In general, such directions are orthogonal, but may be oriented with respect to each other in a variety of ways. Variations in the orientation of directions may results (for example) from optical effects and other distortions. In addition, for the purposes of this description a "linear" or "one-dimensional" barcode shall be defined by the fact that it presents a given set of information in a single dominant orientation. That is, the barcode features are parallel with respect to each other and these features are all aligned in a single dimension. All barcodes are defined by two orthogonal dimensions. In the case of the barcode of FIG. 2, and others herein, the vertical dimension does not present a data content, rather, the orientation of widths and spacings of bars in the horizontal direction carries the data content. This horizontal dimension is considered the dominant orientation. For the purposes of this description, the term "symbol" shall also refer generally to barcodes of a type contemplated herein.

FIG. 3 defines an exemplary barcode 300 that is commonly used in postal applications to display, in general, numerical postal code ("zip code") information. In this case the spacing between individual bars 302 and 304 is constant across the horizontal direction (arrow H), while each bar 302, 304 varies between at least two discrete heights in the vertical direction (arrow V)—namely, a taller bar height (302) and a shorter bar height (304). A set of five adjacent bars (see sets 306 and 308, for example), define a particular number or other character depending upon the particular sequence of tall and short bars in the set of five. Thus, in the example of FIG. 3 the dominant orientation is along the vertical direction V.

FIG. 4 defines a so-called stacked barcode arrangement 400. This scheme is defined by a plurality of horizontally oriented bars 402 that vary in width and spacing along the horizontal direction (arrow H) to thereby encode data. In this manner the horizontal direction can be considered the dominant orientation as in the example of FIG. 2. However, there a plurality of rows of bars stacked along the vertical direction—for example, uppermost adjacent rows 404, 406 and 408. The vertical height of each row is constant and thus, like the horizontal spacing of bars in FIG. 3, the location of each bar row in the code 400 is predictable. Hence, despite the apparent two-dimensional nature of the code 400, its true dominant orientation (in which information varies to derive discrete code data) is along the horizontal direction only.

Figure 1:
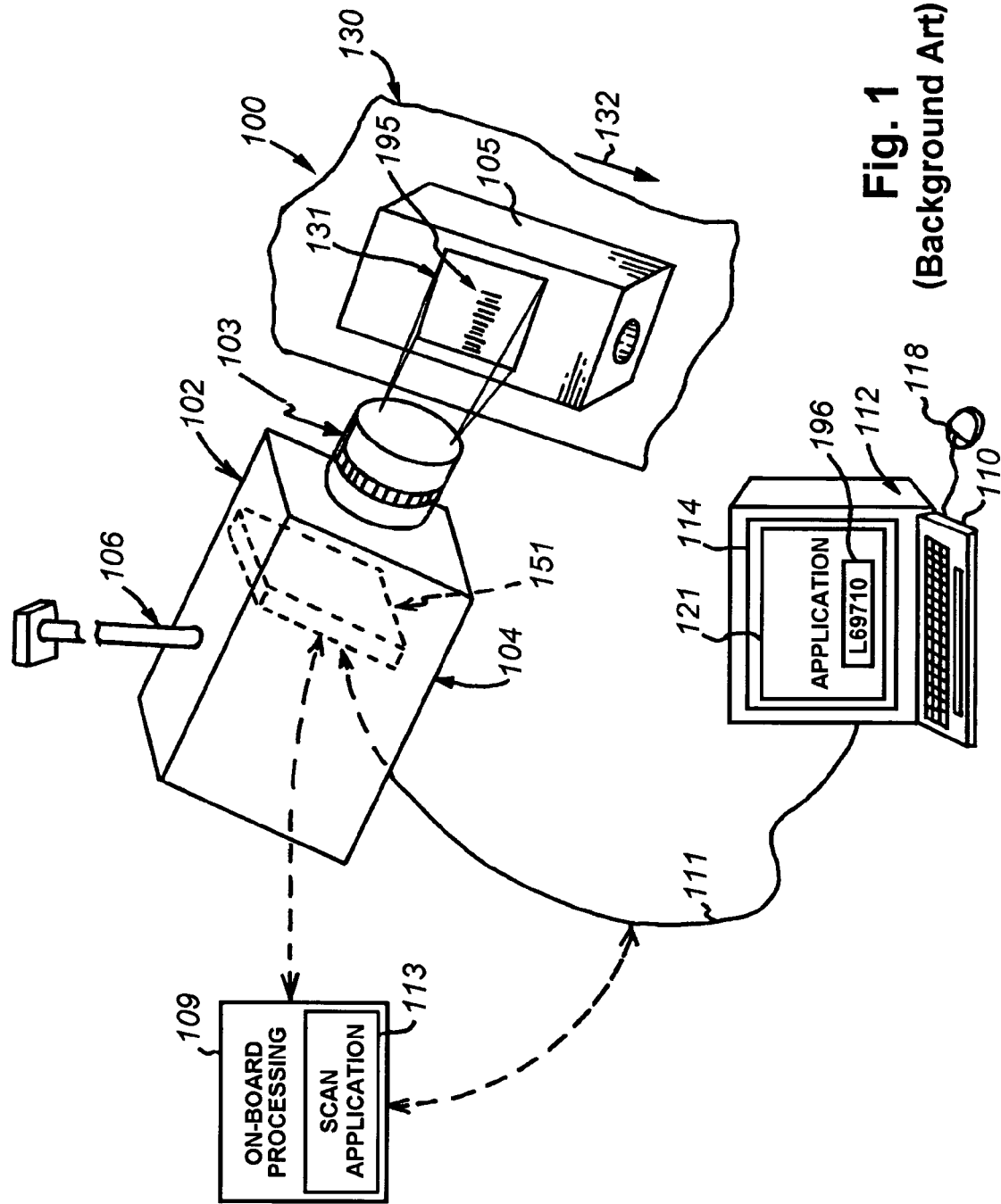
FIG. 1, already described, is a perspective view of a symbology reader according to a prior implementation.

A variety of devices can be employed to read one-dimensional barcodes and, thereafter, decode underlying data contained therein. This description focuses upon the type of reader described with reference to FIG. 1. Such a reader employs an image sensor to acquire image data in the form of a two-dimensional array of image pixels. The image pixels are then processed top locate and decode the image barcode, if any.

Figure 5:
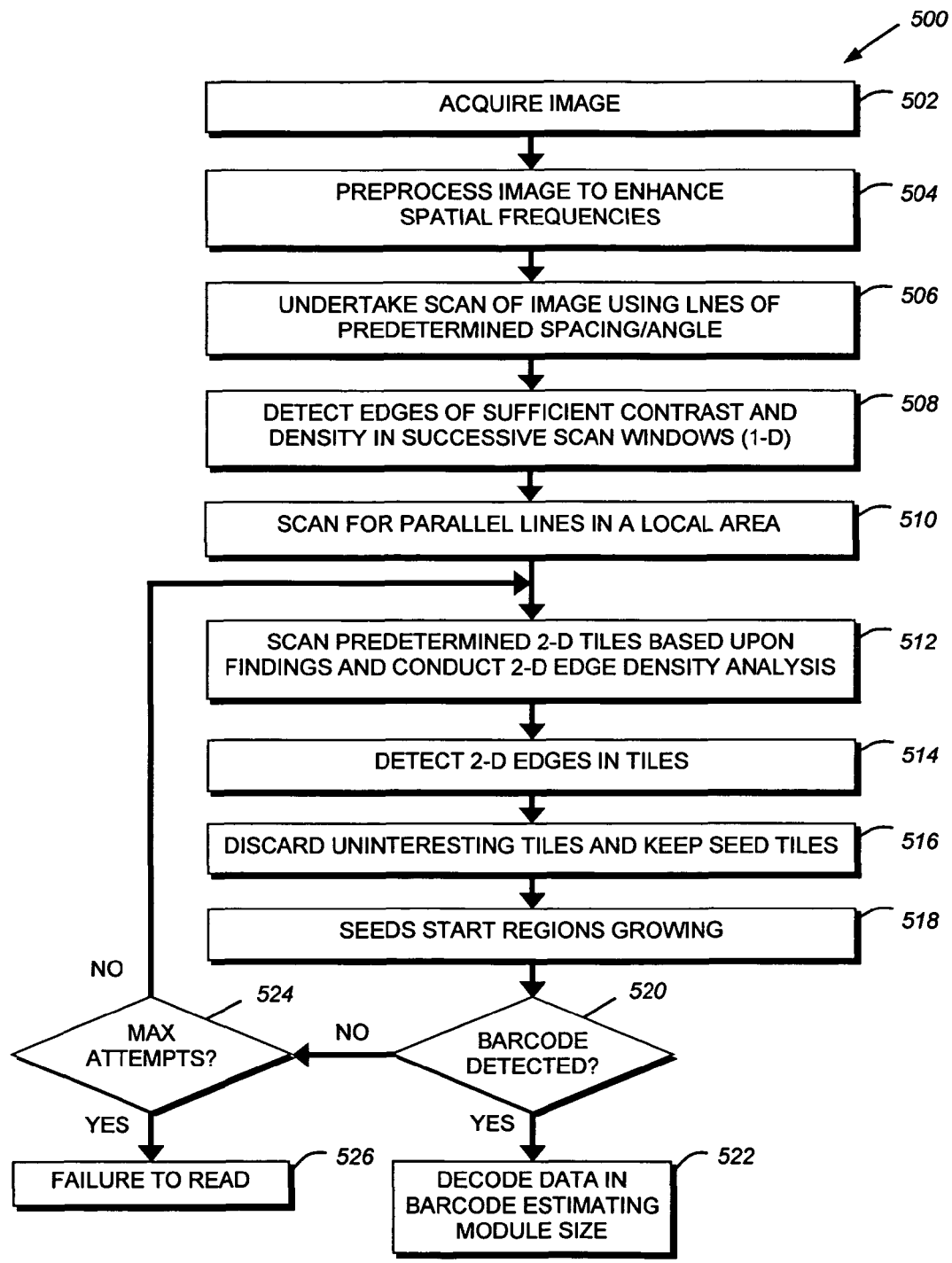
FIG. 5 is a flow diagram of a procedure for identifying and decoding a linear barcode according to a prior implementation.

With reference to FIG. 5, an exemplary prior procedure 500 for acquiring and decoding a barcode from image data is described in detail. After passing an area of an object containing a barcode under the field of view of the reader, an image is acquired in step 502. The acquisition can be manually triggered by an operator, or can be automatically triggered by an object presence sensor or conveyor encoder (for example). Typically, following the acquisition of the image, it is stored in an appropriate reader working memory (RAM for example) and subjected to conventional preprocessing steps (step 504) that may serve to enhance the images features, making edges more crisp and readable, and possibly evening variations in grayscale variation, among other enhancements.

Figure 6:
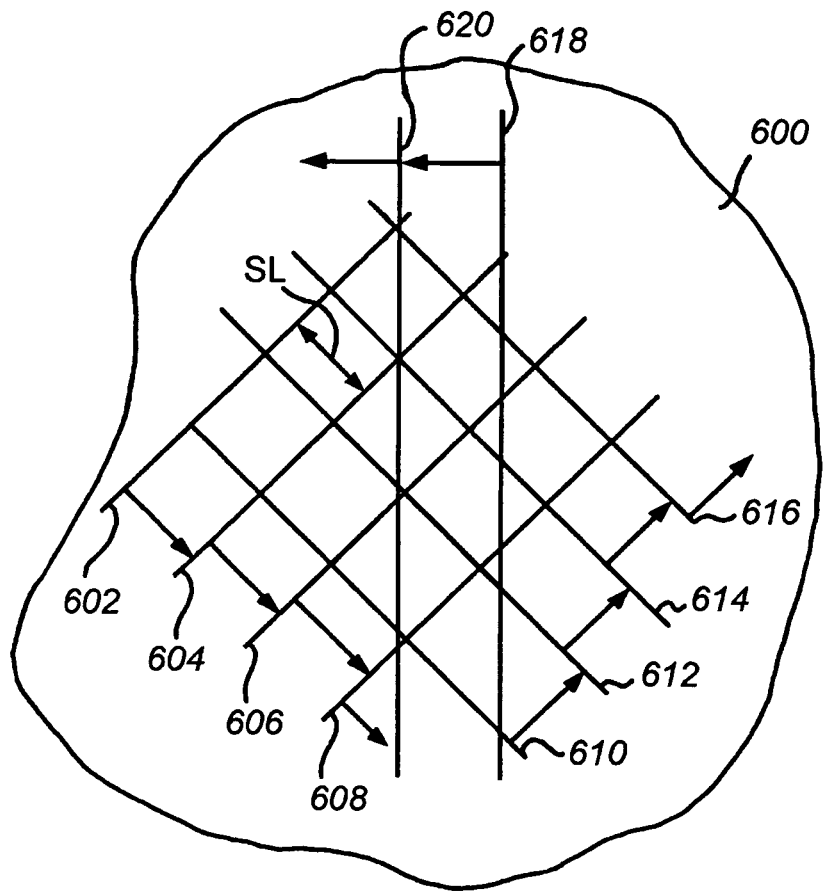
FIG. 6 is a schematic diagram of an exemplary scanning step used to locate barcode-like information in accordance with the procedure of FIG. 5.

Next, the stored image is subjected to a series of line scans along a number of standard directional orientations (step 506). Notably, the size of an acquired image may be large and locating a barcode that may be within a wide range of resolutions (size of the feature (bar) in pixels relative to the total number of pixels in the sensor's field of view), it is computationally most efficient to view only portions of the overall image first in an effort to locate "barcode-like" features quickly. The scan according to one example is shown in FIG. 6. Pixels in the overall image field 600 are addressed and read for gray 11) level along discrete lines in each of a plurality of angular orientations. The scan may occur along (for example) an initial set of spaced lines 602, 604, 606, 608 along a first orientation (45-degree angle herein). A second scan then occurs along an orthogonal orientation as depicted by lines 610, 612, 614 and 616. Further scans may occur along additional orientations (lines 618, 620, etc. in a vertical orientation). The spacing SL between scan lines can be constant or can vary during the process. Some scanning algorithms may also adaptively vary line spacing and angular orientation for regions that show promise using conventional decision processes. Typically, the distance between the scan lines should generally not be larger than the height of the smallest barcode that will be located. Similarly, the angular spacing between the scan lines, as well as the range of angles scanned, should be such that a minimum number of consecutive bars is intersected by at least one scan line for the smallest expected barcode. However, making the distances or angular spacing too large will cause the algorithm to execute slowly.

Either during the scanning process, or when complete, the reader's processor attempts to detect contrasting edges that occur in successive one-dimensional windows/lines (step 508). If detected, these edges become candidates for further scanning. Thereafter, any found edges are scanned particularly for the presence of parallel lines, indicative of barcode-like data (step 510). An effective technique for detecting edges along the scan lines is to derive a 3×3 Sobel edge detection kernel (known in the art) for the horizontal direction only. Thereafter, the kernel is rotated by the angle of the scan line, and then the 3×3 Sobel edge detection kernel is applied to each of the pixels along the scan line. For non-horizontal and non-vertical scan lines, a Bresenham walk algorithm is employed to determine the pixels along the respective scan line. The technique then employs a perform peak detection using a difference threshold (also known in the art) to detect the edges.

After detecting edges of interest, the processor begins a scan of two-dimensional tiles (step 512) in which the detected edges having at least a minimal spatial density are located. In one example, the tiles are arrays of pixels having a predefined height, width that form a fixed pattern (a tessellated checkerboard, for example) across the entire image. Each tile is addressable and any pixel data therein is read discretely by the processor. Based upon the scan of tiles, the processor attempts to detect the edges in two dimensions (2-D) (step 514). The processor then proceeds to discard any tiles that lack "interesting" edge data, i.e. that which suggests a barcode, and retains tiles that appear to contain such data (step 516). Page: 10
In an illustrative example, interesting tiles are those having at least a minimum number of edges and having edges oriented in a predominant direction (as determined using angle histogram processing, known in the art).

Figure 7:
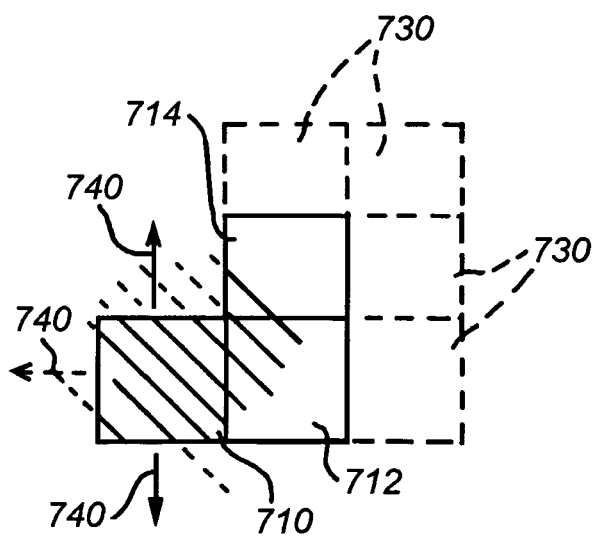
FIG. 7 is a schematic diagram of an image tile-growing procedure in accordance with the procedure of FIG. 5.

As "interesting" tiles retained, the processor attempts to "grow" the regions of interest by scanning tiles that are adjacent to "interesting" tiles for appropriate barcode 2-D edge data. Referring briefly to FIG. 7, a scan has pointed the process to adjacent tiles 710, 712 and 714 that appear to contain barcode like edges. Certain tiles 730 adjacent thereto 730 may have been seeded and are later determined (see below) not to contain information of interest. Conversely, as the process seeds adjacent tiles to tile 710 (arrows 740, the process should locate additional information of interest in the form of continuations of detected lines, as shown in phantom.

The process generally scans any seeded tiles according to steps 512, 514, 516 and 518. In an illustrative example, the scanning processed terminates whenever there cease to be a minimum density of edges. This minimum density is determined by the smallest resolution barcode that must be located. The process of seeding continues until enough adjacent tiles have been added and scanned (decision step 520) to derive a readable code. Once a readable code is located, the process will decode the code (if possible), and present any decoded data (step 520). In general, the decoding step 522 entails the use of an estimate module size so as to derive the approximate resolution of the barcode. The resolution of the code for decoding purposes is derived, generally, by employing a histogram analysis of the bars or other data-containing features. Reading and decoding occurs according to known techniques and is not further described herein.

Naturally if one or all of the seeding attempts fail to produce a readable code in that region of interest, then the process (via decision step 524) eventually ceases and a failure to read is noted (step 526). This may occur after a few iterations fail to define a readable code, or according to another criterion. There may be multiple and simultaneous attempts to seed and decode at different locations within the overall image.

If all attempts fail to derive a readable code, then the reader announces a general failure to read to the operator. At such time, the reader may attempt to automatically reduce the scan resolution or perform other steps to enhance the chances of a successful read.

Note that the above ordering and hierarchy of steps is highly variable and this description is exemplary of one possible reading technique.

As discussed generally above, this reading technique involves significant processing overhead and time that may tend to slow the process of identifying objects and/or lead to multiple read failures. Since a primary source of unreliability is that the process may employ preset resolution and size attributes and scan/seeding orientation and spacing, it is desirable to provide a technique for "tuning" these attributes. Without tuning, the process must default to the use of attributes for the various steps described above (e.g. spacing between scan lines, resolution, filtering of the granularity in contrast) that are somewhat generic and able to cover a wide range of variations. It is recognized that, in certain implementations, such tuning is possible where (on the above-described moving-line example) the location of the reader is generally fixed and known, and the approximate orientation of the underlying one-dimensional barcode, as well as its resolution, is relatively constant.

The resulting "tuned" search and decode process 800 is now described, and thereafter, the procedure by which initial attributes are derived for tuning (e.g. a training procedure or process) will be described in further detail. By way of comparison, the reader may refer to the untuned procedure 500 detailed in FIG. 5. Initially, an image is acquired at the native resolution of the image sensor, similar to step 502 (FIG. 5).

Figure 8:
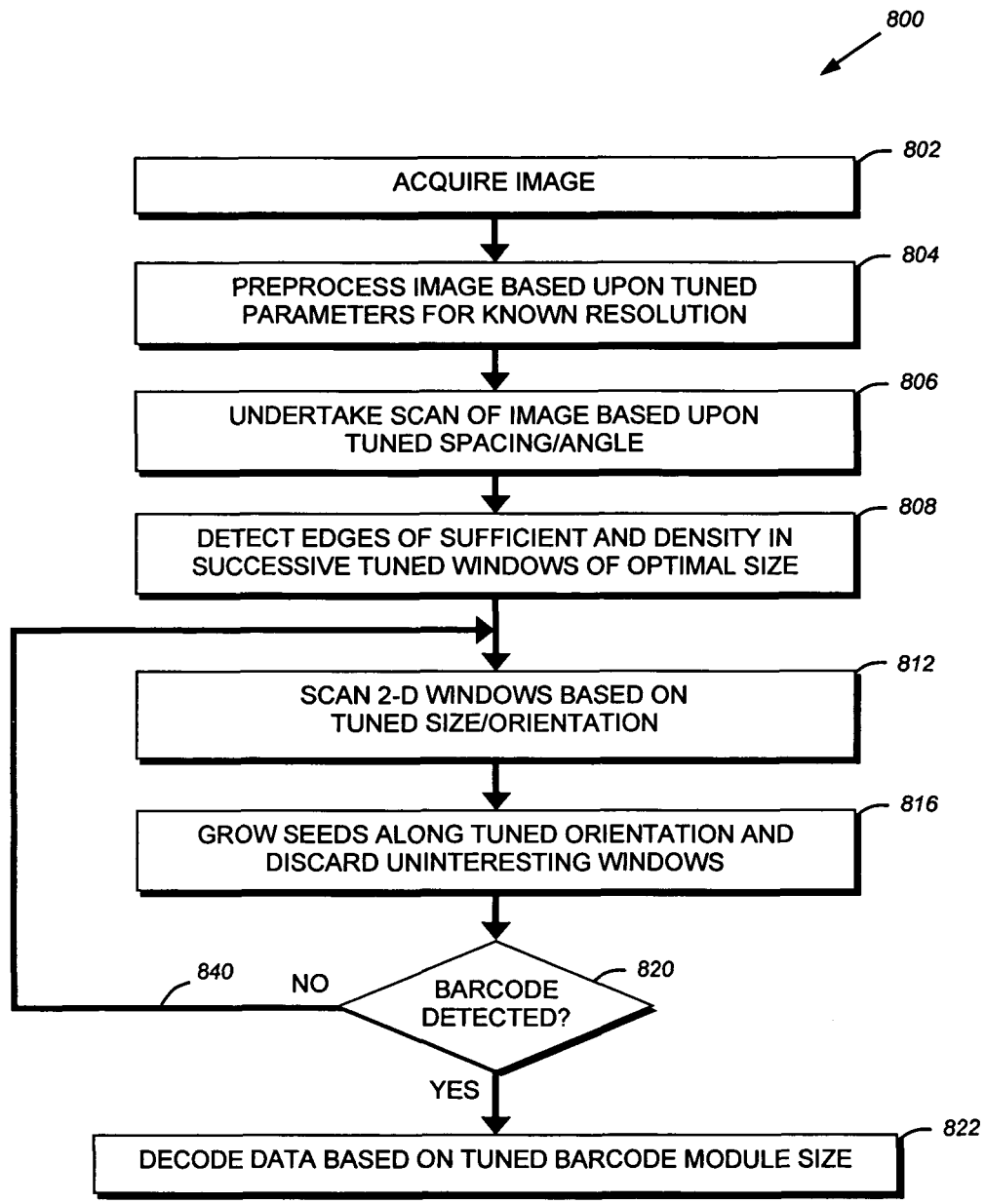
FIG. 8 is a flow diagram of a procedure for identifying and decoding a linear barcode according to an illustrative embodiment.

With reference to FIG. 8, the search and decode procedure/process 800 begins with the acquisition 802 of a runtime image of a barcode to be decoded. The attributes for a similar barcode, with the same invariant features has already been loaded vis the training procedure (see 900 in FIG. 9) described below. Thus, the preprocessing of the image is carried out using the known resolution scale preprocessing appropriately in accordance with step 804. In general, smoothing transitions between light and dark contrast areas and other filtering occurs at a granularity that will best accentuate the features of a barcode having the particular predetermined resolution.

Next, the acquired, preprocessed image is scanned 906 based upon a tuned spacing and angle. Such attributes are derived during the training step based upon reasonably invariant characteristics of the runtime-scanned barcode relative to a trained example. Such invariant characteristics are present since it is assumed that all barcodes presented to the sensor will be (at least one of) a relatively constant distance therefrom, be of the same type, a relatively constant size, and/or oriented at relatively the same angle with respect to the sensor. In this manner, the spacing SL of scan line (FIG. 6) can be set according to the minimum (learned) size (height and width) of the barcode, while the angular range of scan lines is set according to the learned orientation range. Likewise, the angle of such scan lines can vary with respect to the default vertical, horizontal, diagonal, etc. used in the untuned step 506. This allows fewer scan lines to be employed and quicker/more-accurate identification of barcode-like features.

Next, in step 808, the procedure 800 attempts to detect edges of sufficient density relative to the predetermined resolution attribute to suggest barcode features. Windows are established around these areas. The windows may be 2-D areas as the resolution is known. To this end, the procedure divides the image into windows that are sized to match the predetermined resolution and that are angularly oriented in accordance with the predetermined angular orientation of the barcode with respect to the image field of view. This differs from the concept of tiles in that the windows are "tiles" with a specific, barcode-resolution and angle-based size, shape and orientation. Note that windows need not be squares, but can be a variety of regular or irregular polygons that best fit the given profile of the trained barcode. In the illustrative embodiment, image-aligned rectangular windows are employed. Next, the tuned windows are scanned for barcode-like features (step 812) using conventional contrast-sensing, and other appropriate machine vision tools. Windows with interesting data, suggestive of a barcode become seeds and further windows are grown 816 along predetermined angular directions. Interesting tiles are flagged in much the same way they are during the prior procedure 500 of FIG. 5 (using edge statistics). As noted below, this procedure is also used generally during the training phase (see FIG. 9) of the illustrative embodiment. The threshold used during peak detection can be determined using "contrast-sensing" techniques (e.g. histogram tails analysis) known in the art (this can be said for the prior procedure/learning phase as well). Seed-growing also progresses in much the same way as flagging of interesting tiles. However, in the present embodiment, the density of the edges constituting a symbol is more fine-tuned than the prior procedure 500 (i.e. now employing the learned resolution of the symbol). As uninteresting grown windows and/or seeds are located, the grown windows and/or seeds are discarded. The process continues until a barcode is detected (decision step 820). Thereafter, the barcode is decoded if possible (step 822). The process of decoding employs a tuned filter size in that process is aware of the granularity between edges as it determines contrast variations along bar edges. Following the application of the tuned filter, the decode process involves the application of a barcode template of a given type against the acquired image to determine the type of barcode being read and the relative locations of bars by which the underlying data is derived.

Of course, if iterative growth of tuned windows does not yield readable barcode information within a predetermined time, the process eventually fails, and branches along procedure branch 840 where appropriate failure steps (such as steps 524 and 526 in FIG. 5) occur.

It should be clear that providing a tuned procedure 800 allows for a more-rapid and more-reliable sensing of linear barcodes and many steps in the prior procedure 500 can be omitted or streamlined.

To obtain the predetermined tuning attributes, that system must be trained based upon an exemplary barcode with invariant attributes (e.g. resolution, orientation, etc.) that will remain invariant during a runtime operation. This may limit the variability of barcode distance and orientation from the sensor. Of course, where orientation may change or distance may change significantly, tuning attributes can be based solely on certain invariant attributes (e.g. primarily resolution, primarily orientation, etc.) in alternate embodiments. In such instances, the procedure 800 is modified as appropriate to provide for a more-variable resolution and/or angular orientation. To this end, steps in procedure 800 that rely on a plurality of attributes being invariant may be modified in whole or in part by the corresponding steps of the prior procedure 500 (FIG. 5), or another appropriate procedure that yields desired barcode information from a scanning process. In other words, the tuned procedure may be partially detuned where certain (ordinarily invariant) attributes are not invariant.

Figure 9:
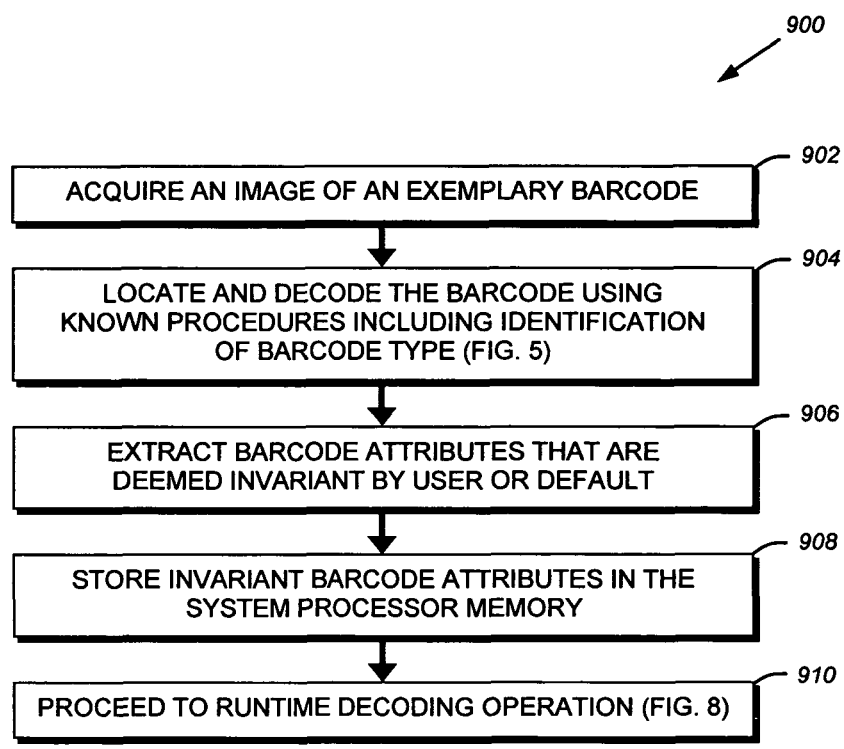
FIG. 9 is a flow diagram of a training procedure by which attributes relative to an exemplary linear barcode are obtained.

FIG. 9 details a training procedure or process 900 according to an embodiment of this invention in which attributes for use in tuning the procedure (800) are derived. First, an exemplary barcode (symbol) of a type to be used during runtime is located relative to the sensor at a distance and orientation that mirrors the runtime placement. In this location a native image of the barcode is acquired (step 902). Next, the procedure 900 locates and decodes the barcode using known procedures, such as those shown and described in the procedure 500 of FIG. 5 (step 904). In the process of performing the scanning and decoding of the image, measurements are made of various attributes of the exemplary barcode, such as its resolution and the orientation of its lines with respect to the field of view. In addition, measurements of contrast variation and any attributes particular to a given type of barcode can be derived. Next the procedure 900 extracts any barcode features that can be deemed invariant (step 906). This can be a user defined list provided via an interface or it can be based upon certain defaults. Some exemplary invariant attributes include, but are not limited to, symbol width, symbol height, minimum bar width (i.e. resolution), symbol angle in the image field of view, symbol polarity and symbol type. The decoding step may contain a number of these attributes in an appropriate look-up table or other predetermined list. Where the decoding step cannot provide the given attributes, they can be measured using know techniques, such as a machine vision caliper edge tool.

After extracting desired attributes from the exemplary barcode, these attributes are stored in an appropriate location in the system processor memory for further use (step 908). The system is now ready to decode 910 different barcodes of the same type and having the same invariant attributes in the manner described for the runtime procedure 800 of FIG. 8. As described above, during the runtime decoding procedure 800 the stored attributes are employed to constrain the search for the exemplary symbol and then decode it.

It is contemplated that the training process can be repeated to further refine the attributes in alternate embodiments, either employing the same exemplary barcode/symbol or a different barcode of the same type, and having the same invariant features.

The foregoing has been a detailed description of illustrative embodiments of the invention. Various modifications can be made without departing from the spirit and scope thereof. For example, the arrangement of scanning system image elements and processors is highly variable. The scanning systems, while depicted as a fixed unit can, in alternate embodiments include a degree of variability in placement. Appropriate commercially available distance/range sensors, attitude sensors, and other like components, can be incorporated into the sensor, with respect to the image plane to compensate for changes in angle and placement between scans. In an alternate embodiment, such sensors can be used in conjunction with, for example an aiming dot to enable use of a handheld scanner. Once trained for a given rotational orientation and distance, the handheld either prompts the user to apply proper alignment and range, or the system actually induces a correction factor for relatively minor changes in attitude and/or range. As noted above, the underlying procedure for locating and identifying barcodes is highly variable and may include additional and/or differing steps to those shown and described herein. It is also assumed that any and all processes and procedures performed herein can be implemented as electronic hardware, software, consisting of computer-readable instructions or a combination of hardware and software. Moreover, to the extent that a process is described herein, it is contemplated that such a process can be physically located with the system processor or distributed variously throughout the system. Accordingly, this description is meant to be taken only by way of example and not to otherwise limit the scope of the invention.

What is claimed is:

1. A system for searching and decoding runtime symbols comprising:
   a training process that searches for and decodes an exemplary symbol within a first image and thereby derives and stores invariant symbol attributes with respect to predetermined invariant characteristics possessed by the exemplary symbol including invariant dimensional attributes, the stored invariant symbol attributes determining a tuned boundary associated with the exemplary symbol;
   a tuned runtime search process that constrains a search for a runtime symbol within a subsequent image based upon the stored invariant symbol attributes and the tuned boundary, and thereby determines a runtime boundary of the runtime symbol within the subsequent image; and
   a runtime decoding process that decodes data contained within the runtime symbol using the runtime boundary of the runtime symbol and the stored invariant symbol attributes in the subsequent image.

2. The system as set forth in claim 1 wherein the invariant symbol attributes are related to at least one of resolution, size, angular orientation within the image field, symbol polarity or symbol type.

3. The system as set forth in claim 1 wherein the system includes an image sensor and wherein the image sensor is in an approximately fixed orientation with respect to the exemplary symbol and the runtime symbol when the system respectively acquired an image of the exemplary symbol and the runtime symbol.

4. The system as set forth in claim 1 wherein the exemplary symbol comprises a linear barcode.

5. The system as set forth in claim 1 wherein the tuned runtime search process is constructed and arranged to perform a preprocessing of the subsequent image based upon at least one of the invariant symbol attributes related to resolution of the exemplary symbol.

6. The system as set forth in claim 1 wherein the tuned runtime search process is constructed and arranged to provide scan lines that search for runtime symbol-like features within the subsequent image that are spaced and angled within the subsequent image based upon the invariant symbol attributes.

7. The system as set forth in claim 6 wherein the tuned runtime search process is constructed and arranged to provide seed windows within the subsequent image relative to the symbol-like features and provide growth windows that adjoin selected of the seed windows so as to search for runtime symbols within the seed windows and the growth windows, each of the seed windows and the growth windows being sized and oriented based upon the invariant symbol attributes.

8. The system as set forth in claim 1 wherein the runtime decoding process is constructed and arranged to apply filtration to the subsequent image and decode the runtime symbol based upon the invariant symbol attributes.

9. The system as set forth in claim 8 wherein the runtime decoding process is constructed and arranged to apply filtration and decode based upon symbol type.

10. The system as set forth in claim 1 wherein the invariant symbol attributes are related to size and angular orientation.

11. The system as set forth in claim 1 wherein the runtime decoding process is also constrained by the stored invariant symbol attributes.

12. A method for searching and decoding runtime symbols comprising the steps of:
searching for and decoding an exemplary symbol within a first image and thereby deriving and storing invariant symbol attributes with respect to predetermined invariant characteristics possessed by the exemplary symbol, including invariant dimensional attributes, the stored invariant symbol attributes determining a tuned boundary associated with the exemplary symbol;
constraining a runtime search for a runtime symbol within a subsequent image based upon the stored invariant symbol attributes and the tuned boundary, and thereby determines a runtime boundary of the runtime symbol within the subsequent image; and
decoding data contained within the runtime symbol using the runtime boundary of the runtime symbol in the subsequent image.

13. The method as set forth in claim 12 wherein the invariant symbol attributes are related to at least one of resolution, size, angular orientation within the image field, symbol polarity or symbol type.

14. The method as set forth in claim 12 further comprising locating an image sensor that acquires images of the exemplary symbol and the runtime symbol in an approximately fixed orientation with respect to the exemplary symbol and the runtime symbol when the system respectively acquired an image of the exemplary symbol and the runtime symbol.

15. The method as set forth in claim 12 wherein the exemplary symbol comprises a linear barcode.

16. The method as set forth in claim 12 wherein the step of constraining includes preprocessing these subsequent image based upon at least one of the attributes related to resolution of the exemplary symbols.

17. The method as set forth in claim 12 wherein the step of constraining includes providing scan lines that search for runtime symbol-like features within the subsequent image that are spaced within the subsequent image based upon the invariant symbol attributes and the tuned boundary.

18. The method as set forth in claim 17 wherein the step of constraining includes providing seed windows within the subsequent image relative to the symbol-like features and providing growth windows that adjoin selected of the seed windows so as to search for runtime symbols within the seed windows and growth windows, and sizing and orienting each of the seed windows and the growth windows based upon the invariant symbol attributes.

19. The method as set forth in claim 12 wherein the step of decoding includes applying filtration to the subsequent image and deriving data from the runtime symbol based upon the invariant symbol attributes.

20. The method as set forth in claim 19 wherein the step of decoding includes decoding based upon one of the invariant symbol attributes that defines symbol type.

21. The method as set forth in claim 12 wherein the invariant symbol attributes are related to size and angular orientation.

22. A system for searching and decoding runtime symbols comprising:
a training process that searches for and decodes an exemplary symbol within a first image and thereby derives and stores invariant symbol attributes with respect to predetermined invariant characteristics possessed by the exemplary symbol, including at least a resolution, wherein the resolution is a minimum bar width of the symbol; and
a tuned runtime search process that constrains a search for a runtime symbol within a subsequent image based upon the stored invariant symbol attributes and attempts to detect edges of the runtime symbol relative to the stored resolution, and thereby locates the runtime symbol within the subsequent image.

23. The system as set forth in claim 22 wherein the invariant symbol attributes are related to at least one of resolution, size, angular orientation within the image field or symbol polarity.

24. The system as set forth in claim 22 wherein the approximate boundaries of the runtime symbol within the second image field of the system include at least a length, a width, and an angular orientation.

25. A method for searching and decoding runtime symbols comprising the steps of:
searching for and decoding an exemplary symbol within a first image and thereby deriving and storing invariant symbol attributes with respect to predetermined invariant characteristics possessed by the exemplary symbol including at least a resolution, wherein the resolution is a minimum bar width of the symbol;
constraining a runtime search for a runtime symbol within a subsequent image based upon the stored invariant symbol attributes; and
attempting to detect edges of the runtime symbol relative to the stored resolution and thereby locates the runtime symbol within the subsequent image.

26. The method as set forth in claim 25 wherein the invariant symbol attributes are related to at least one of resolution, size, angular orientation within the image field or symbol polarity.

* * * * *